United States Patent
Guinart

(10) Patent No.: US 9,759,557 B2
(45) Date of Patent: Sep. 12, 2017

(54) METHOD FOR LOCATING THE POSITION OF WHEELS WHICH ARE FITTED WITH AN ELECTRONIC UNIT INCORPORATING MEANS OF MEASURING AN OPERATING PARAMETER OF SAID WHEEL

(71) Applicants: CONTINENTAL AUTOMOTIVE FRANCE INTELLECTUAL PROPERTY, Toulouse (FR); CONTINENTAL AUTOMOTIVE GMBH, Hannover (DE)

(72) Inventor: Nicolas Guinart, Toulouse (FR)

(73) Assignees: CONTINENTAL AUTOMOTIVE FRANCE, Toulouse (FR); CONTINENTAL AUTOMOTOVE GMBH, Hannover (DE)

( * ) Notice: Subject to any disclaimer, the term of this patent is extended or adjusted under 35 U.S.C. 154(b) by 360 days.

(21) Appl. No.: 14/429,791

(22) PCT Filed: Aug. 29, 2013

(86) PCT No.: PCT/EP2013/002602
§ 371 (c)(1),
(2) Date: Mar. 20, 2015

(87) PCT Pub. No.: WO2014/044355
PCT Pub. Date: Mar. 27, 2014

(65) Prior Publication Data
US 2015/0233711 A1 Aug. 20, 2015

(30) Foreign Application Priority Data
Sep. 21, 2012 (FR) ...................................... 12 58908

(51) Int. Cl.
*B60C 23/10* (2006.01)
*G01B 21/00* (2006.01)
(Continued)

(52) U.S. Cl.
CPC ............. *G01B 21/00* (2013.01); *G01D 5/142* (2013.01); *G01P 15/00* (2013.01)

(58) Field of Classification Search
USPC .................................... 340/442, 445; 701/10
See application file for complete search history.

(56) References Cited

U.S. PATENT DOCUMENTS 5,808,190 A 9/1998 Ernst
6,112,587 A 9/2000 Oldenettel
(Continued)

FOREIGN PATENT DOCUMENTS

DE 102009059788 A1 6/2011
EP 0806306A2 A2 11/1997
(Continued)

OTHER PUBLICATIONS

International Search Report, dated Oct. 9, 2013, from corresponding PCT application.

*Primary Examiner* — Lam Nguyen
(74) *Attorney, Agent, or Firm* — Young & Thompson

(57) ABSTRACT

The invention relates to a method for locating the position of wheels (5-8) of a vehicle (V) comprising, mounted on each wheel, an electronic unit (1-4) incorporating measurement means (9) for measuring a predetermined operating parameter for said wheel, referred to as a location parameter and, assigned to each wheel position and mounted on the vehicle (V), fixed means (13-16) for measuring the location parameter for said wheel. This location method consists, firstly, for each electronic unit (1-4), in comparing the values measured by the mobile measurement means (9) incorporated into said electronic unit with those measured by each of the fixed measurement means (13-16), secondly, for each wheel position, comparing the values measured by the fixed measurement means (13-16) assigned to said wheel position with those measured by each of the mobile measurement means
(Continued)

Figure 1:
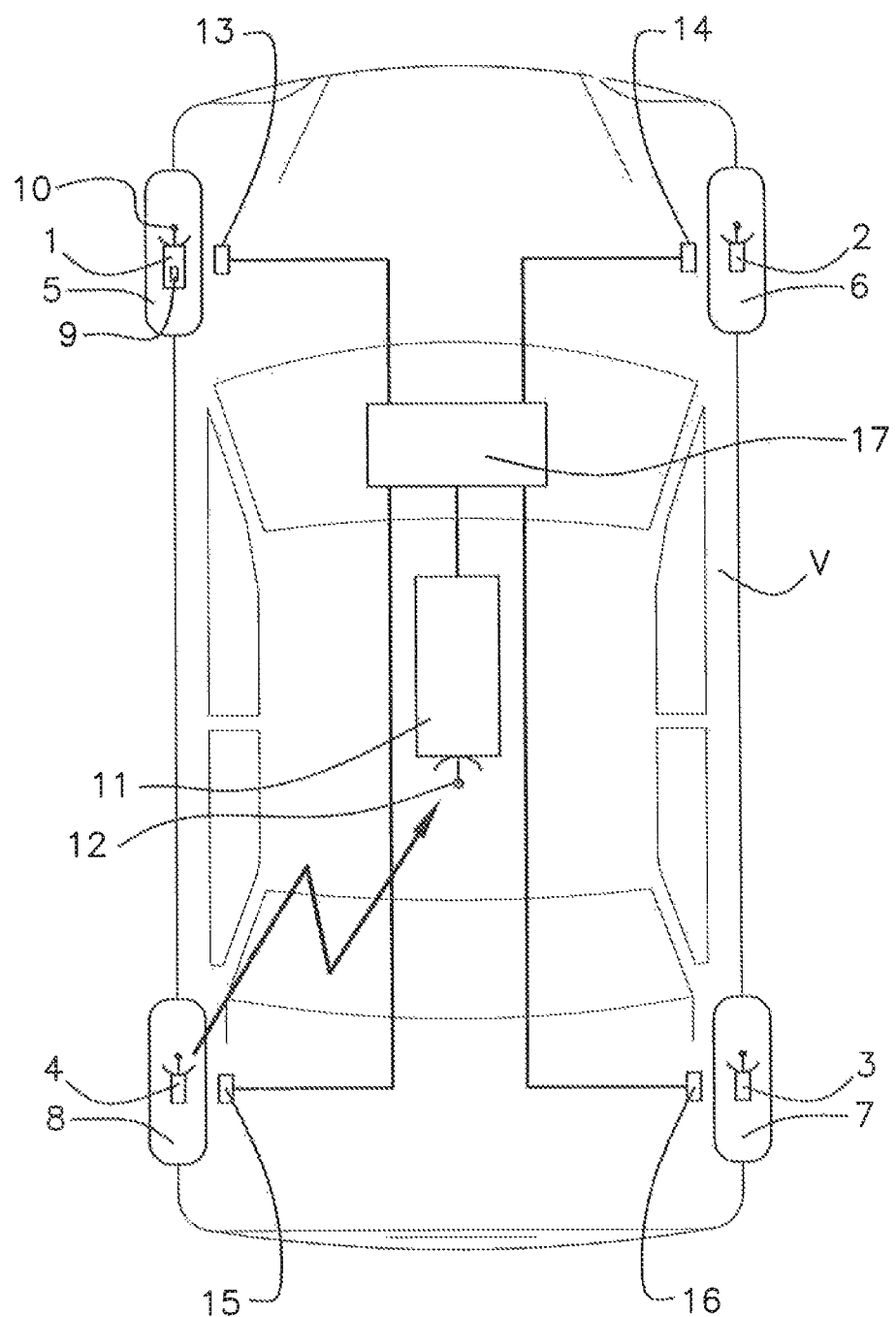

(9), then assigning a wheel position to an electronic unit (1-4) when these correspond with one another.

12 Claims, 2 Drawing Sheets

(51) Int. Cl.
    *G01D 5/14*      (2006.01)
    *G01P 15/00*      (2006.01)

(56) References Cited

U.S. PATENT DOCUMENTS

| | | | |
|---|---|---|---|
| 6,731,205 B2 * | 5/2004 | Schofield | B60C 23/061 |
| | | | 116/34 R |
| 8,436,724 B2 * | 5/2013 | Hannon | B60C 23/0416 |
| | | | 340/445 |
| 8,498,759 B1 * | 7/2013 | Juzswik | B60C 23/0416 |
| | | | 701/10 |
| 2011/0313623 A1 | 12/2011 | Greer et al. | |
| 2012/0259507 A1 | 10/2012 | Fink | |

FOREIGN PATENT DOCUMENTS

| | | |
|---|---|---|
| EP | 0895879 A2 | 2/1999 |
| EP | 2450202 A1 | 5/2012 |
| JP | 2010122023 A | 6/2010 |

* cited by examiner

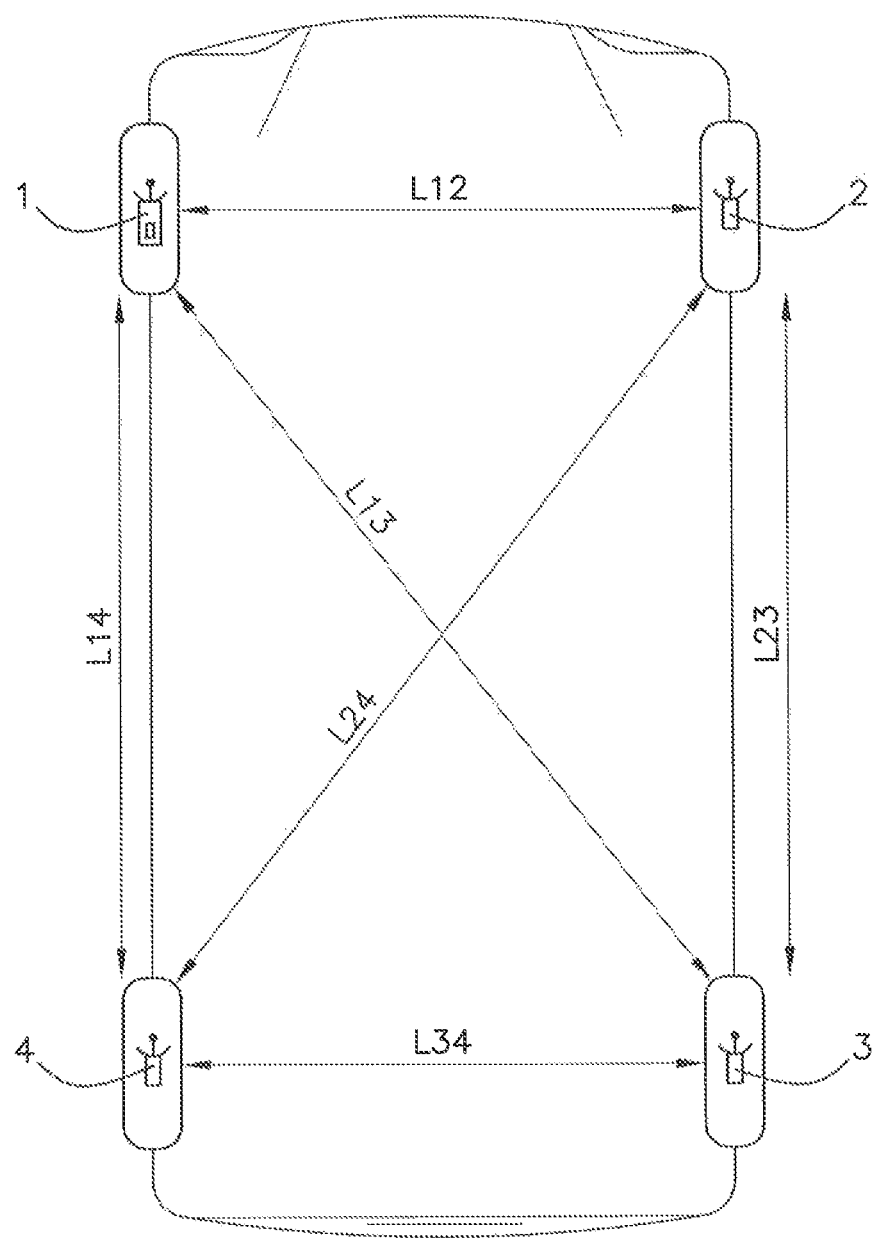

METHOD FOR LOCATING THE POSITION OF WHEELS WHICH ARE FITTED WITH AN ELECTRONIC UNIT INCORPORATING MEANS OF MEASURING AN OPERATING PARAMETER OF SAID WHEEL

The invention relates to a method for locating the position of wheels which are fitted with an electronic unit incorporating means of measuring an operating parameter of said wheel, mounted on a vehicle comprising means for measuring this parameter.

Increasing numbers of motor vehicles are provided, for safety purposes, with monitoring systems including sensors mounted on each of the wheels of the vehicle, used for measuring parameters such as the pressure or temperature of the tires fitted to these wheels, and intended to inform the driver of any abnormal change in the measured parameter.

These monitoring systems are conventionally provided with an electronic unit mounted on each of the wheels of the vehicle, incorporating a microprocessor and a radio frequency transmitter in addition to the aforesaid sensors, and with a central unit for receiving the signals sent by the transmitters, including a computer incorporating a radio frequency receiver connected to an antenna.

One of the problems to be resolved by these monitoring systems is that there is a requirement to associate each signal received by the central unit with information on the location of the electronic unit and therefore of the wheel from which the signal originated, this requirement continuing during the lifetime of the vehicle, meaning that it must be complied with even after wheels have been changed, or, more simply, after the positions of these wheels have been exchanged.

Numerous methods have now been proposed for the purpose of locating the positions of the wheels of a vehicle, including location methods such as those described, notably, in patents EP 0 806 306 and EP 0 895 879, the principle of which is based on the correlation found between the signals delivered by a sensor fitted to a wheel and the signals delivered by a sensor mounted on the vehicle near this wheel.

Since most present-day vehicles are fitted with active safety systems such as an ABS system for preventing wheel locking or an ESP system for dynamic stability control, these location methods are of considerable interest, notably, in terms of their installation cost, because the wheel location is performed by correlation of the signals delivered by the sensors of said active safety system and signals delivered by the sensors that are usually incorporated in the electronic units of the monitoring system.

Consequently, the application of these location methods simply requires the implementation of software for processing the delivered signals, but without the need for any addition of special equipment.

The present invention also proposes a location method based on this correlation principle, with the primary aim of providing a location method of this kind offering very high performance in terms of reactivity and reliability.

For this purpose, the invention proposes a method for locating the positions of the wheels of a vehicle comprising:
r wheels, each fitted with an electronic unit incorporating means, called mobile means, for measuring a predetermined operating parameter of said wheel, called the location parameter, and a transmitter intended to transmit signals including data representative of the measured values of said location parameter and an identification code of said electronic unit,
r means, called fixed means, assigned to each wheel position and mounted on the vehicle for measuring the location parameter of said wheel,
and a central unit mounted on the vehicle and provided with means for receiving, on the one hand, signals from the electronic units, and, on the other hand, data representative of the values measured by the fixed measurement means,
said location method consisting in studying the correlation between the values measured by the fixed measurement means and those measured by the mobile measurement means, in order to assign a wheel position to each electronic unit.

According to the invention, this location method is characterized in that:
for each electronic unit, the data representative of the values measured by the mobile measurement means incorporated in said electronic unit are compared with those measured by each of the r fixed measurement means, and the correlation between said data is studied in order to establish a correspondence between an electronic unit and a wheel position,
for each wheel position, the data representative of the values measured by the fixed measurement means assigned to said wheel position are compared with those measured by each of the r mobile measurement means incorporated in the electronic units, and the correlation between said data is studied in order to establish a correspondence between a wheel position and an electronic unit, and
a wheel position is assigned to an electronic unit when there is a mutual correspondence between said wheel position and said electronic unit.

The location method according to the invention therefore consists in searching for, on the one hand, the "preferred" wheel position of each electronic unit, and, on the other hand, the "preferred" electronic unit of each wheel position, in order to establish cross-correlations between said electronic units and said wheel positions.

In practice, this decision procedure, which is very simply and easily implemented, results in a convergence which is at least 30% to 40% faster than that obtained by the existing procedures, the saving in time being as much as 70% in the best cases.

This location method therefore leads to a significant improvement in the performance and robustness of the system, with consequently greater freedom of maneuver in the design of said system.

The location method may also be used to train the electronic units fitted to wheels already mounted on the vehicle. For this purpose, advantageously, according to the invention, a value representative of the sum of the values representative of the dispersion found for each of the wheel positions is determined for each electronic unit, this total value is compared with a predetermined threshold value, and the electronic unit is excluded from the location procedure if this total value is below said threshold.

According to an advantageous embodiment of the method according to the invention, data, such as the variance, representative of the dispersion of the values measured by the mobile measurement means relative to the values measured by the fixed measurement means are determined for the purpose of studying the correlations.

Additionally, in order to study the correlations, a data element representative of the ratio, called the overall ratio, of the weight of the dispersion of the values measured by said electronic unit to the weights of the dispersions of the values measured by each of the other electronic units is advantageously determined, according to the invention, for each electronic unit/wheel position pair.

Furthermore, in order to determine each overall ratio, unit ratios, each corresponding to the ratio of the weight of the dispersion of the values measured by said electronic unit to the weight of the dispersion of the values measured by each of the other electronic units, are advantageously determined in the first place, according to the invention, for each electronic unit/wheel position pair, and the product of the unit ratios is calculated in order to determine the overall ratio.

The value of each unit ratio is also advantageously adjusted as a function of the number of signals "processed" for the purpose of its determination, and, to this end, a threshold number of signals from each electronic unit is advantageously determined according to the invention, above which threshold the value of the unit ratios is corrected by a weighting factor whose value increases with the number of signals received.

According to another advantageous embodiment of the method according to the invention, the following are calculated for the purpose of the correlations:
for each electronic unit, and for each wheel position, a characteristic value equal to the ratio of the overall ratio calculated for this wheel position to the sum of all the overall ratios calculated for the different wheel positions,
for each wheel position, and for each electronic unit, a characteristic value equal to the ratio of the overall ratio calculated for this electronic unit to the sum of all the overall ratios calculated for the different electronic units.

Additionally, the two specific characteristic values relating to the electronic unit and to the wheel position respectively are advantageously combined according to the invention, in order to define a characteristic value called the combined characteristic value.

On this basis, the method according to the invention advantageously consists in calculating, for the purpose of the correlations:
for each electronic unit, and for each wheel position, a standardized characteristic value equal to the ratio of the combined characteristic value calculated for this wheel position to the sum of all the combined characteristic values calculated for the different wheel positions,
for each wheel position, and for each electronic unit, a standardized characteristic value equal to the ratio of the combined characteristic value calculated for this electronic unit to the sum of all the combined characteristic values calculated for the different electronic units.

The final step in the procedure consists, advantageously, according to the invention, in comparing each standardized characteristic value with a predetermined threshold value, and in assigning a value representative of a correspondence to the electronic unit/wheel position pair if said characteristic value is greater than the threshold value.

Other characteristic objects and advantages of the invention will be apparent from the following detailed description, referring to the attached drawings, which represent a preferred embodiment of the invention by way of non-limiting example. In these drawings:

FIG. 1 is a schematic top view of a vehicle provided with a monitoring system and an active safety system allowing the execution of the method according to the invention for locating the position of the wheels of said vehicle, and FIG. 2 is a schematic view of this vehicle on which indications are provided for the purpose of explaining the method used according to the invention.

The method according to the invention is adapted to be used for locating the position of wheels of a vehicle V as shown in FIG. 1, having four wheels 5-8 and fitted with a system for monitoring tire parameters, such as the pressure and/or temperature, and with an active safety system such as an ABS anti-wheel-locking system or an ESP dynamic stability control system.

In most cases, the monitoring system conventionally includes, in the first place, in association with each wheel 5-8, an electronic unit 1-4, which, for example, is fixed to the rim of said wheel so as to be positioned inside the tire profile.

Each of these electronic units 1-4 incorporates sensors dedicated to the measurement of tire parameters, connected to a microprocessor computer unit connected to a transmitter 10.

Each of these electronic units 1-4 also conventionally incorporates means 9 for measuring the angular position of said electronic unit. These measurement means may advantageously be composed of an accelerometer adapted to supply modulated signals representative of the values of gravity and therefore of the angular position of the electronic unit, the frequency of which signals, being equal to the rotation frequency of the wheels, can also be used to calculate the rotation speed of said wheels.

The monitoring system also comprises a central unit 11 located in the vehicle V, having a microprocessor and incorporating a receiver 12 for receiving the signals transmitted by the transmitters 10 of each of the four electronic units 1-4.

The vehicle V is also fitted with an active safety system such as an ABS anti-wheel-locking system or an ESP dynamic stability control system, having four wheel speed sensors 13-16 positioned on the vehicle V, each sensor being placed near a wheel 5-8 and being adapted to supply data representative of the rotation speed of said wheel.

Additionally, this active safety system has an ABS or ESP computer 17, which is connected to the various wheel speed sensors 13-16, so as to receive wheel speed information measured by said sensors, and is programmed to make anticipatory adjustments to prevent the locking of the wheels 5-8.

In most cases, the wheel speed sensors 13-16 consist of inductive, magnetoresistive or Hall effect sensors, adapted to measure the speed of each wheel 5-8 on a toothed or magnetic wheel.

For locating each wheel 5-8 of the vehicle V, the method according to the invention consists in using the data supplied by the accelerometers 9 and the sensors 13-16, according to the method described below.

Firstly, the electronic units 1-4 fitted to the wheels 5-8 deliver a plurality of signals for predetermined angular positions of said electronic units.

The transmission period of these signals is of the order of several seconds, generally 15 to 20 seconds, for the purpose of compliance with radio frequency standards on the one hand, and to allow sufficient "desynchronization" of the wheels 5-8 on the other hand.

At the same time, the sensors 13-16 deliver to the computer 17 data representative of the orientation of the associated wheels 5-8, in the form of values convertible to angular values (the tooth number of the toothed wheel, or the like).

In the case of an active safety system, the transmission period of these signals is markedly shorter than that of the electronic units 5-8, being of the order of 10 ms to 20 ms, for example.

The location method used according to the invention is described below with the aid of numerical tables representative of values successively obtained in the steps of this location method.

The first step of this location method consists in:

constructing for each electronic unit 1-4, by correlation between the data supplied by the accelerometer 9 and those supplied by the sensors 13-16, four distributions for each electronic unit 1-4, that is to say one distribution for each wheel position 5-8, calculating, for each distribution, a value representative of the dispersion of said distribution, which in this example consists in the variance of this distribution.

These variances are represented in the tables below (which represent the real values of each variance (Table 1)) followed by the rounded values of each variance (Table 2), in which:

Nb represents the number of signals from each electronic unit 1-4, on the basis of which the variance has been calculated, and Vi represents the variance found for electronic unit (i), where i=1 to 4, for the front left position (FL), the front right position (FR), the rear right position (RR) and the rear left position (RL) respectively.

TABLE 1

Variances (real values)

| | | Variance | | | |
|---|---|---|---|---|---|
| ID | Nb | V1 (FL) | V2 (FR) | V3 (RR) | V4 (RL) |
| 1_FL | 15 | 300.64 | 733.3066667 | 523.8222222 | 803.1733333 |
| 2_FR | 15 | 757.9288889 | 268.8888889 | 616.9955556 | 812.3822222 |
| 3_RR | 15 | 465.9733333 | 572.3822222 | 184.5155556 | 480.0622222 |
| 4_RL | 15 | 628.3288889 | 291.4488889 | 638.0622222 | 149.36 |

TABLE 2 variances (rounded values)

| | | | Variance | | |
|---|---|---|---|---|---|
| ID | RF Nb | V1 (FL) | V2 (FR) | V3 (RR) | V4 (RL) |
| 1_FL | 15 | 301 | 733 | 524 | 803 |
| 2_FR | 15 | 758 | 269 | 617 | 812 |
| 3_RR | 15 | 466 | 572 | 185 | 480 |
| 4_RL | 15 | 628 | 291 | 638 | 149 |

The next step, shown in Table 3 below, consists in calculating, for each electronic unit 1-4/wheel position 5-8 pair, unit ratios $lij=Vj/Vi$, shown in FIG. 2, each corresponding to the ratio of the weight of the dispersion of the values measured by said electronic unit to the weight of the dispersion of the values measured by each of the other electronic units.

TABLE 3

Unit ratios lij

| ID\Ratio | Nb | I12 | I13 | I14 | I23 | I24 | I34 |
|---|---|---|---|---|---|---|---|
| 1_FL | 15 | 2.44 | 1.74 | 2.67 | 0.71 | 1.1 | 1.53 |
| 2_FR | 15 | 0.35 | 0.81 | 1.07 | 2.29 | 3.02 | 1.32 |
| 3_RR | 15 | 1.23 | 0.4 | 1.03 | 0.32 | 0.84 | 2.59 |
| 4_RL | 15 | 0.46 | 1.02 | 0.24 | 2.19 | 0.51 | 0.23 |

These values lij are then corrected by a weighting coefficient as a function of the number Nb of signals from each electronic unit 1-4, on the basis of which the variance has been calculated.

This weighting coefficient is designed so that the effect of these values lij is proportional to the number Nb of signals received, and, since these values are intended to be multiplied by each other, as described in the next step, the aim is to bring them close to the neutral value, equal to 1 for a product, when the number Nb of signals is small.

By way of example, this weighting coefficient may vary between a value Cp of 0% for Nb≤2 and a value Cp of 100% for Nb≥10, with, for example, an intermediate value Cp of 60% for Nb=7.

Additionally, on the basis of these values Cp of the weighting coefficients, the accepted value lij is accepted is equal to:

$Cp$ % $(lij-1)$ when $lij \geq 1$, $1-(Cp$ % $(1-lij))$ when $lij<1$.

In the present numerical example, the number Nb of signals received is equal to 15 for each electronic unit 1-4, and the weighting coefficient is therefore equal to 100% and thus has no effect on the calculated values lij.

The next step is to calculate, for each electronic unit 1-4/wheel position 5-8 pair, a data element representative of the ratio, called the overall ratio, of the weight of the dispersion of the values measured by said electronic unit to the weights of the dispersions of the values measured by each of the other electronic units.

This calculation is a matter of calculating, as shown in the table below, for each column of rank i of a given electronic unit, where i=1 to 4, the product Π lij, where j=1 to 4 and j≠i.

Thus, notably, the values of column 1 (FL) correspond to the values I12×I13×I14, the values of column 2 (FR) correspond to the values I21×I23×I24, and so on.

It should be noted that the values lji are equal to 1/lij, and therefore the values lij given in the table below are sufficient to calculate all the overall ratios.

As shown in Table 4 below, the maximum (MAX) of the overall ratios per row and per column is also found.

TABLE 4

| | | Overall ratio (rounded values) | | | | |
|---|---|---|---|---|---|---|
| ID\POS | Nb | FL | FR | RR | RL | MAX |
| 1_FL | 15 | 11.34 | 0.32 | 1.24 | 0.22 | 11.34 |
| 2_FR | 15 | 0.3 | 19.76 | 0.71 | 0.23 | 19.76 |
| 3_RR | 15 | 0.51 | 0.22 | 20.23 | 0.45 | 20.23 |
| 4_RL | 15 | 0.11 | 2.43 | 0.1 | 35.52 | 35.52 |
| MAX | — | 11.34 | 19.76 | 20.23 | 35.52 | — |

The next step is to calculate, for each electronic unit 1-4, and for each wheel position 5-8, a characteristic value, consisting in a standardized ratio, equal to the ratio of the overall ratio calculated for this wheel position 5-8 to the value MAX of all the overall ratios calculated for the different wheel positions (the maximum value of the overall ratios for each row of the table above).

The results of this step are shown in Table 5 below.

TABLE 5

Standardized ratio for the electronic units

| | | POS | | | |
|---|---|---|---|---|---|
| ID | Nb | FL | FR | RR | RL |
| 1_FL | 15 | 1.00 | 0.03 | 0.11 | 0.02 |
| 2_FR | 15 | 0.02 | 1.00 | 0.04 | 0.01 |
| 3_RR | 15 | 0.03 | 0.01 | 1.00 | 0.02 |
| 4_RL | 15 | 0.00 | 0.07 | 0.00 | 1.00 |

Similarly, as shown in Table 6 below, a characteristic value is calculated for each electronic unit 1-4, and for each wheel position 5-8, this value consisting in a standardized ratio, equal to the ratio of the overall ratio calculated for this electronic unit 1-4 to the value MAX of all the overall ratios calculated for the different electronic units 1-4 (the maximum value (MAX) of the overall ratios for each column of the table of overall ratios).

TABLE 6

Standardized ratios for the wheel position

| | | POS | | | |
|---|---|---|---|---|---|
| ID | Nb | FL | FR | RR | RL |
| 1_FL | 15 | 1.00 | 0.02 | 0.06 | 0.01 |
| 2_FR | 15 | 0.03 | 1.00 | 0.04 | 0.01 |
| 3_RR | 15 | 0.04 | 0.01 | 1.00 | 0.01 |
| 4_RL | 15 | 0.01 | 0.12 | 0.00 | 1.00 |

The next step, the results of which are shown in Table 7 below, consists in combining, for each electronic unit 1-4/wheel position 5-8 pair, the two specific characteristic values consisting in the standardized ratios for the electronic unit 1-4 and for the wheel position 5-8 respectively, so as to define a characteristic value called the combined characteristic value, consisting in a combined standardized ratio.

TABLE 7 combined standardized ratios

| ID\POS | Nb | FL | FR | RR | RL | Sum |
|---|---|---|---|---|---|---|
| 1_FL | 15 | 1.0000 | 0.0006 | 0.0066 | 0.0002 | 1.0074 |
| 2_FR | 15 | 0.0006 | 1.0000 | 0.0016 | 0.0001 | 1.0023 |
| 3_RR | 15 | 0.0012 | 0.0001 | 1.0000 | 0.0002 | 1.0015 |
| 4_RL | 15 | 0.0000 | 0.0084 | 0.0000 | 1.0000 | 1.0084 |
| sum | — | 1.0018 | 1.0091 | 1.0082 | 1.0005 | — |

The next step is to find the answer to the following question: "which is the preferred electronic unit 1-4 for each position?"

For this purpose, a standardized characteristic value (Table 8), equal to the ratio of the combined characteristic value calculated for this wheel position 5-8 (values in Table 7 above) to the sum of all the combined characteristic values calculated for the different wheel positions 5-8 (the sum of each row of the table above), is calculated for each electronic unit 1-4 and for each wheel position 5-8.

TABLE 8 standardized characteristic values for the electronic units

| | | POS | | | |
|---|---|---|---|---|---|
| ID | Nb | FL | FR | RR | RL |
| 1_FL | 15 | 0.9928 | 0.0005 | 0.0067 | 0.0001 |
| 2_FR | 15 | 0.0004 | 0.9982 | 0.0013 | 0.0001 |
| 3_RR | 15 | 0.0011 | 0.0001 | 0.9985 | 0.0003 |
| 4_RL | 15 | 0.0000 | 0.0083 | 0.0000 | 0.9917 |

Similarly, the next step is to find the answer to the following question: "which is the preferred position for each electronic unit 1-4?"

For this purpose, a standardized characteristic value (Table 9), equal to the ratio of the combined characteristic value calculated for this electronic unit 1-4 to the sum of all the combined characteristic values calculated for the different electronic units 1-4 (the sum of each column of the table of combined standardized ratios), is calculated for each wheel position 5-8 and for each electronic unit 1-4.

TABLE 9 standardized characteristic values for the wheel position

| | | POS | | | |
|---|---|---|---|---|---|
| ID | Nb | FL | FR | RR | RL |
| 1_FL | 15 | 0.9985 | 0.0005 | 0.0066 | 0.0001 |
| 2_FR | 15 | 0.0004 | 0.9911 | 0.0013 | 0.0001 |
| 3_RR | 15 | 0.0011 | 0.0001 | 0.9921 | 0.0003 |
| 4_RL | 15 | 0.0000 | 0.0083 | 0.0000 | 0.9995 |

The next two steps, the results of which are shown in the two tables (8 and 9) below, consist in comparing each of the values of the preceding two tables with a predetermined threshold value, equal to 0.9 in this example, and assigning a value representative of a correspondence, equal to 1 in this example, to the electronic unit 1-4/wheel position 5-8 pair if said characteristic value is above a threshold value, and, if this is not the case, assigning a value representative of a non-correspondence, equal to 0 in this example.

TABLE 10

Comparison relating to the electronic units

| | | POS | | | |
|---|---|---|---|---|---|
| ID | Nb | FL | FR | RR | RL |
| 1_FL | 15 | 1 | 0 | 0 | 0 |
| 2_FR | 15 | 0 | 1 | 0 | 0 |
| 3_RR | 15 | 0 | 0 | 1 | 0 |
| 4_RL | 15 | 0 | 0 | 0 | 1 |

TABLE 11

Comparison relating to the wheel position

| | | POS | | | |
|---|---|---|---|---|---|
| ID | Nb | FL | FR | RR | RL |
| 1_FL | 15 | 1 | 0 | 0 | 0 |
| 2_FR | 15 | 0 | 1 | 0 | 0 |
| 3_RR | 15 | 0 | 0 | 1 | 0 |
| 4_RL | 15 | 0 | 0 | 0 | 1 |

TABLE 11-continued

Comparison relating to the wheel position

| | | POS | | | |
|---|---|---|---|---|---|
| ID | Nb | FL | FR | RR | RL |

Finally, the last step is to combine the results of the two tables above (Tables 10 and 11) so as to check for any presence of mutual correspondences represented by a combined value, equal to 2 in this example (Table 12).

The location procedure ends when at least three correspondences have been found, the fourth correspondence being deducible from the established correspondences.

TABLE 12

Mutual correspondence

| | POS | | | |
|---|---|---|---|---|
| ID | FL | FR | RR | RL |
| 1_FL | 2 | 0 | 0 | 0 |
| 2_FR | 0 | 2 | 0 | 0 |
| 3_RR | 0 | 0 | 2 | 0 |
| 4_RL | 0 | 0 | 0 | 2 |

In the example shown above (Table 12):
Identifier 1 (wheel 5) is in the front left position,
Identifier 2 (wheel 6) is in the front right position,
Identifier 3 (wheel 7) is in the rear right position, and
Identifier 4 (wheel 8) is in the rear left position.

The invention claimed is:

1. A method for locating the position of the wheels (5-8) of a vehicle (V) comprising:
   r wheels (5-8), each fitted with an electronic unit (1-4) incorporating means (9), called mobile means, for measuring a predetermined operating parameter of said wheel, called the location parameter, and a transmitter (10) intended to transmit signals including data representative of the measured values of said location parameter and an identification code of said electronic unit,
   r means (13-16), called fixed means, assigned to each wheel position (5-8) and mounted on the vehicle (V) for measuring the location parameter of said wheel,
   and a central unit (11) mounted on the vehicle (V) and provided with means (12) for receiving, on the one hand, signals from the electronic units (1-4), and, on the other hand, data representative of the values measured by the fixed measurement means (13-16),
   said location method consisting in studying the correlation between the values measured by the fixed measurement means (13-16) and those measured by the mobile measurement means (9), in order to assign a wheel position (5-8) to each electronic unit (1-4), this location method being characterized in that:
      for each electronic unit (1-4), the data representative of the values measured by the mobile measurement means (9) incorporated in said electronic unit are compared with those measured by each of the r fixed measurement means (13-16), and the correlation between said data is studied in order to establish a correspondence between an electronic unit (1-4) and a wheel position (5-8),
      for each wheel position (5-8), the data representative of the values measured by the fixed measurement means (13-16) assigned to said wheel position are compared with those measured by each of the r mobile measurement means (9) incorporated in the electronic units (1-4), and the correlation between said data is studied in order to establish a correspondence between a wheel position (5-8) and an electronic unit (1-4), and
      a wheel position (5-8) is assigned to an electronic unit (1-4) when there is a mutual correspondence between said wheel position and said electronic unit.

2. The location method as claimed in claim 1, characterized in that data representative of the dispersion of the values measured by the mobile measurement means (9) relative to the values measured by the fixed measurement means (13-16) are determined for the purpose of studying the correlations.

3. The location method as claimed in claim 2, characterized in that a value representative of the sum of the values representative of the dispersion found for each of the wheel positions (5-8) is determined for each electronic unit (1-4), this total value is compared with a predetermined threshold value, and the electronic unit (1-4) is excluded from the location procedure if this total value is below said threshold.

4. The location method as claimed in claim 2, characterized in that, for each electronic unit (1-4)/wheel position (5-8) pair, a data element representative of the ratio, called the overall ratio, of the weight of the dispersion of the values measured by said electronic unit to the weights of the dispersions of the values measured by each of the other electronic units is determined for each electronic unit (1-4) for the purpose of studying the correlations.

5. The location method as claimed in claim 4, characterized in that, in order to determine each overall ratio, unit ratios, each corresponding to the ratio of the weight of the dispersion of the values measured by said electronic unit to the weight of the dispersion of the values measured by each of the other electronic units, are calculated in the first place for each electronic unit (1-4)/wheel position (5-8) pair, and the product of the unit ratios is calculated in order to determine the overall ratio.

6. The location method as claimed in claim 5, characterized in that a threshold number of signals from each electronic unit (1-4) is defined, above which threshold the value of the unit ratios is corrected by a weighting factor whose value increases with the number of signals received.

7. The location method as claimed in claim 5, characterized in that the following are calculated, for the purpose of the correlations:
   for each electronic unit (1-4), and for each wheel position (5-8), a characteristic value equal to the ratio of the overall ratio calculated for this wheel position (5-8) to the sum of all the overall ratios calculated for the different wheel positions, and
   for each wheel position (5-8), and for each electronic unit (1-4), a characteristic value equal to the ratio of the overall ratio calculated for this electronic unit (1-4) to the sum of all the overall ratios calculated for the different electronic units (1-4).

8. The location method as claimed in claim 7, characterized in that, for each electronic unit (1-4)/wheel position (5-8) pair, the two specific characteristic values relating to the electronic unit (1-4) and the wheel position (5-8) respectively are combined, so as to define a characteristic value called the combined characteristic value.

9. The location method as claimed in claim 8, characterized in that the following are calculated, for the purpose of the correlations:

for each electronic unit (1-4), and for each wheel position (5-8), a standardized characteristic value equal to the ratio of the combined characteristic value calculated for this wheel position (5-8) to the sum of all the combined characteristic values calculated for the different wheel positions (5-8), for each wheel position (5-8), and for each electronic unit (1-4), a standardized characteristic value equal to the ratio of the combined characteristic value calculated for this electronic unit (1-4) to the sum of all the combined characteristic values calculated for the different electronic units (1-4).

10. The location method as claimed in claim 9, characterized in that each standardized characteristic value is compared with a predetermined threshold value, and a value representative of a correspondence is assigned to the electronic unit (1-4)/wheel position (5-8) pair if said characteristic value is greater than the threshold value.

11. The location method as claimed in claim 3, characterized in that, for each electronic unit (1-4)/wheel position (5-8) pair, a data element representative of the ratio, called the overall ratio, of the weight of the dispersion of the values measured by said electronic unit to the weights of the dispersions of the values measured by each of the other electronic units is determined for each electronic unit (1-4) for the purpose of studying the correlations.

12. The location method as claimed in claim 6, characterized in that the following are calculated, for the purpose of the correlations:

for each electronic unit (1-4), and for each wheel position (5-8), a characteristic value equal to the ratio of the overall ratio calculated for this wheel position (5-8) to the sum of all the overall ratios calculated for the different wheel positions, and for each wheel position (5-8), and for each electronic unit (1-4), a characteristic value equal to the ratio of the overall ratio calculated for this electronic unit (1-4) to the sum of all the overall ratios calculated for the different electronic units (1-4).

* * * * *